US008990195B2

(12) United States Patent
Lee (10) Patent No.: US 8,990,195 B2
(45) Date of Patent: Mar. 24, 2015

(54) SYSTEMS AND METHODS FOR SEARCHING MEDIA CONTENT BASED ON AN EDITING FILE (75) Inventor: Hsieh-Te Lee, Taoyuan (TW)

(73) Assignee: Cyberlink Corp., Shindian, Taipei (TW)

( * ) Notice: Subject to any disclaimer, the term of this patent is extended or adjusted under 35 U.S.C. 154(b) by 918 days.

(21) Appl. No.: 12/186,754

(22) Filed: Aug. 6, 2008

(65) Prior Publication Data

US 2010/0036808 A1 Feb. 11, 2010

(51) Int. Cl.
*G06F 17/30* (2006.01)
(52) U.S. Cl.
CPC ...... *G06F 17/30781* (2013.01); *G06F 17/3082* (2013.01); *Y10S 707/913* (2013.01)
USPC ........... 707/728; 707/913; 386/248; 386/278; 386/280
(58) Field of Classification Search
CPC ................ G06F 17/30784; G06F 17/3082
USPC .................. 707/728, 913; 386/248, 278, 280
See application file for complete search history.

(56) References Cited

U.S. PATENT DOCUMENTS

| 5,852,435 A | 12/1998 | Vigneaux et al. |
| 6,889,383 B1 * | 5/2005 | Jarman ........................... 725/28 |
| 8,209,401 B2 * | 6/2012 | Raciborski .................... 709/219 |
| 8,447,171 B2 * | 5/2013 | Jung et al. ..................... 386/324 |
| 2002/0069218 A1 | 6/2002 | Sull et al. |
| 2003/0220877 A1 * | 11/2003 | Searle .............................. 705/50 |
| 2005/0086069 A1 * | 4/2005 | Watson et al. ..................... 705/1 |
| 2005/0193010 A1 * | 9/2005 | DeShan et al. ............. 707/104.1 |
| 2005/0246324 A1 * | 11/2005 | Paalasmaa et al. ................ 707/3 |
| 2006/0259588 A1 * | 11/2006 | Lerman et al. ................ 709/219 |

FOREIGN PATENT DOCUMENTS

GB 2316527 A 2/1998

* cited by examiner

*Primary Examiner* — William Spieler
(74) *Attorney, Agent, or Firm* — McClure, Qualey & Rodack, LLP (57) ABSTRACT

Various embodiments described herein provide users with a fast and efficient way for identifying scenes for editing purposes. At least one embodiment is a method for searching media content based on identification data embedded in an editing file. The method comprises receiving the editing file and extracting identification data from the editing file, wherein the identification data is uniquely associated with particular media content. The method further comprises searching one or a plurality of media content based on the identification data and identifying matching media content, performing a secure download of the identified media content, and performing playback of the media content based on special effects specified in the editing file, wherein the media content is unmodified during playback.

21 Claims, 8 Drawing Sheets

SYSTEMS AND METHODS FOR SEARCHING MEDIA CONTENT BASED ON AN EDITING FILE

TECHNICAL FIELD

The present disclosure generally relates to multimedia content and more particularly, relates to searching media content based on an editing file.

BACKGROUND

With the vast array of video editing tools available, many people can readily edit existing video and incorporate special effects to customize videos and to produce stylish graphics. These videos may later be published for others to view. In many cases, however, an individual may want a more professional look before sharing the video with friends and family. Use of professional video editing services may not be a feasible alternative in many instances due to cost. Furthermore, traditional off-the-shelf video editing solutions are proving to fall short in meeting the needs of consumers. One common problem with traditional video editing solutions is the amount of time and degree of complexity involved in the overall editing process. Another perceived problem associated with conventional methods is that the original video is typically modified during the editing process. This can present a problem if the video content is under copyright protection.

SUMMARY

Briefly described, one embodiment, among others, is an apparatus for searching media content based on identification data embedded in an editing file. In accordance with such embodiments, the apparatus comprises a processor module configured to read the editing file and extract identification data from the editing file, wherein the identification data is uniquely associated with particular media content, and a search engine configured to search one or a plurality of media content based on the identification data and identify matching media content. The apparatus further comprises a module configured to perform a secure download of the identified media content and a playback module configured to output the media content based on special effects specified in the editing file, wherein the media content is unmodified during playback.

Another embodiment is a method for searching media content based on identification data embedded in an editing file. The method comprises receiving the editing file and extracting identification data from the editing file, wherein the identification data is uniquely associated with particular media content. The method further comprises searching one or a plurality of media content based on the identification data and identifying matching media content, performing a secure download of the identified media content, and performing playback of the media content based on special effects specified in the editing file, wherein the media content is unmodified during playback.

Yet another embodiment is a program embodied in a computer readable medium and executable by a processor-based system. The program comprises logic configured to receive an editing file and extract identification data from the editing file, wherein the identification data is uniquely associated with particular media content, and wherein the identification data is based on attributes of the particular media content. The program further comprises logic configured to search a database of media content based on the identification data and identifies matching media content, logic configured to perform a secure download of the identified media content, and logic configured to perform playback of the media content based on special effects specified in the editing file, wherein the media content is unmodified during playback.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Figure 1:
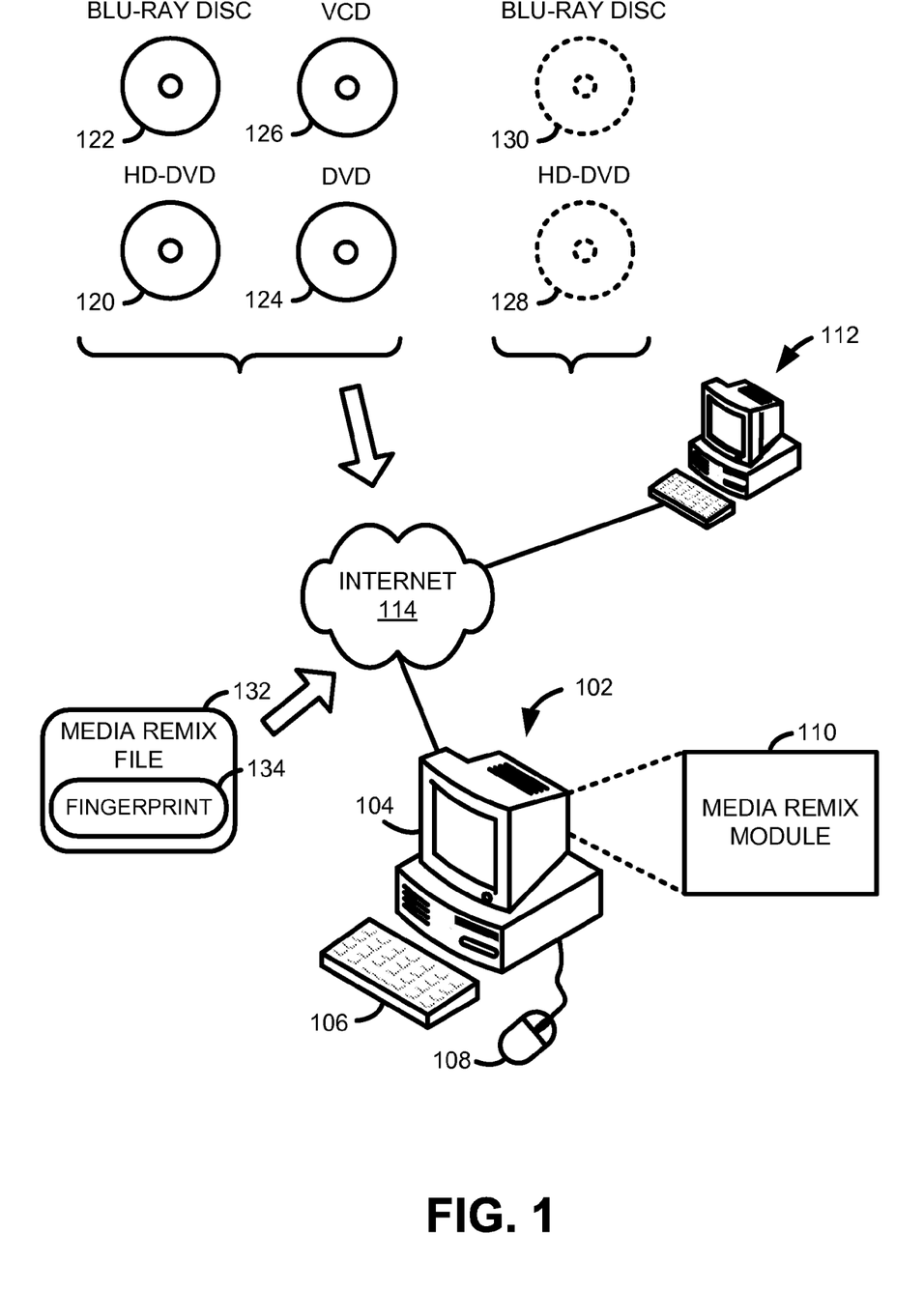
FIG. 1 depicts a top-level diagram of a system for searching media content based on identification data.

Reference is made to FIG. 1, which depicts a top-level diagram of a system for searching media content based on identification data. For some embodiments, a system for searching media content based on identification data embedded in an editing file may be incorporated in a computing device 102 such as a computer workstation or a laptop, for example. The computing device 102 may include a display 104 and input devices such as a keyboard 106 and a mouse 108. Furthermore, the computing device 102 may execute a media remix module 110, which may comprise playback software stored on a computer readable medium executable by a processor that allows a user to view a movie title, input special effects, and search media content associated with a particular media remix file or editing file 132. For purposes of this disclosure, the phrases "remix file" and "editing file" may be used interchangeably and generally refer to a file associated with particular media content that contains special effects to be incorporated into the associated media content. For some embodiments, the media remix module 110 may be integrated with a software DVD player and configured to provide a user interface. Using an input device such as a mouse 108, the user may perform searching functions via the computing device 102. Furthermore, the remix module 110 may comprise a module for storing identification data associated with particular media content (e.g., a movie title) in the editing file 132.

The media remix file 132 shown in FIG. 1 may therefore include identification data associated with media content stored on a media content storage medium. For purposes of nomenclature, the identification data may be referred herein as a fingerprint 134. Generally, the fingerprint 134 uniquely identifies particular media content such as a DVD title, for example. The computing device 102 may be configured to read multimedia content in various formats or stored on various types of storage media. As non-limiting examples, the computing device 102 may be configured to read media content encoded in such formats as Digital Video Disc (DVD) 124, Video CD (VCD) 126, and newer formats such as High Definition DVD (HD-DVD) 120 and BLU-RAY Disc 122.

In some embodiments, the computing device 102 may also be configured to read multimedia content from managed copies of an HD-DVD 128 or a BLU-RAY Disc 130. The phrase "managed copy" refers to authorized copies of multimedia content used as a reference video for editing purposes. The above exemplary formats are merely examples, and it is intended that the various embodiments described herein cover any type of multimedia content in its broadest sense.

The computing device 102 accepts the storage media 120, 122, 124, 126 or managed copies 128, 130 containing the video content and plays back the video for a user to view. In some embodiments, the computing device 102 may be further coupled to a network, such as the Internet 114. In accordance with some embodiments, a user may download a media remix file 132 authored by another user via the Internet. Based on the fingerprint 134 embedded within the media remix file, the user may then utilize the media remix module 110 to search media content associated with the media remix file 132. For such embodiments, video content in the form of a managed copy, for example, may be downloaded via the Internet 114. The video content may then be played while special effects specified in the media remix file 132 are incorporated into the content during playback.

It should be emphasized that in accordance with exemplary embodiments described herein, the video content is left unmodified as the special effects are not embedded into the video content itself. In this regard, the computing device 102 depicted in FIG. 1 provides users with a means for searching a large repository of video content without performing a manual search. Identification information (i.e., fingerprint 134) contained in the media remix file 132 is used to facilitate the process of automatically identifying matching media content. In accordance with other embodiments, the user may specify additional special effects to be incorporated into the identified media content by editing the media remix file 132. For example, a user may incorporate a series of customized subtitles and audio effects and upload these customized effects for another user to view during playback of the same video content (e.g., a copy of the movie title).

Figure 2:
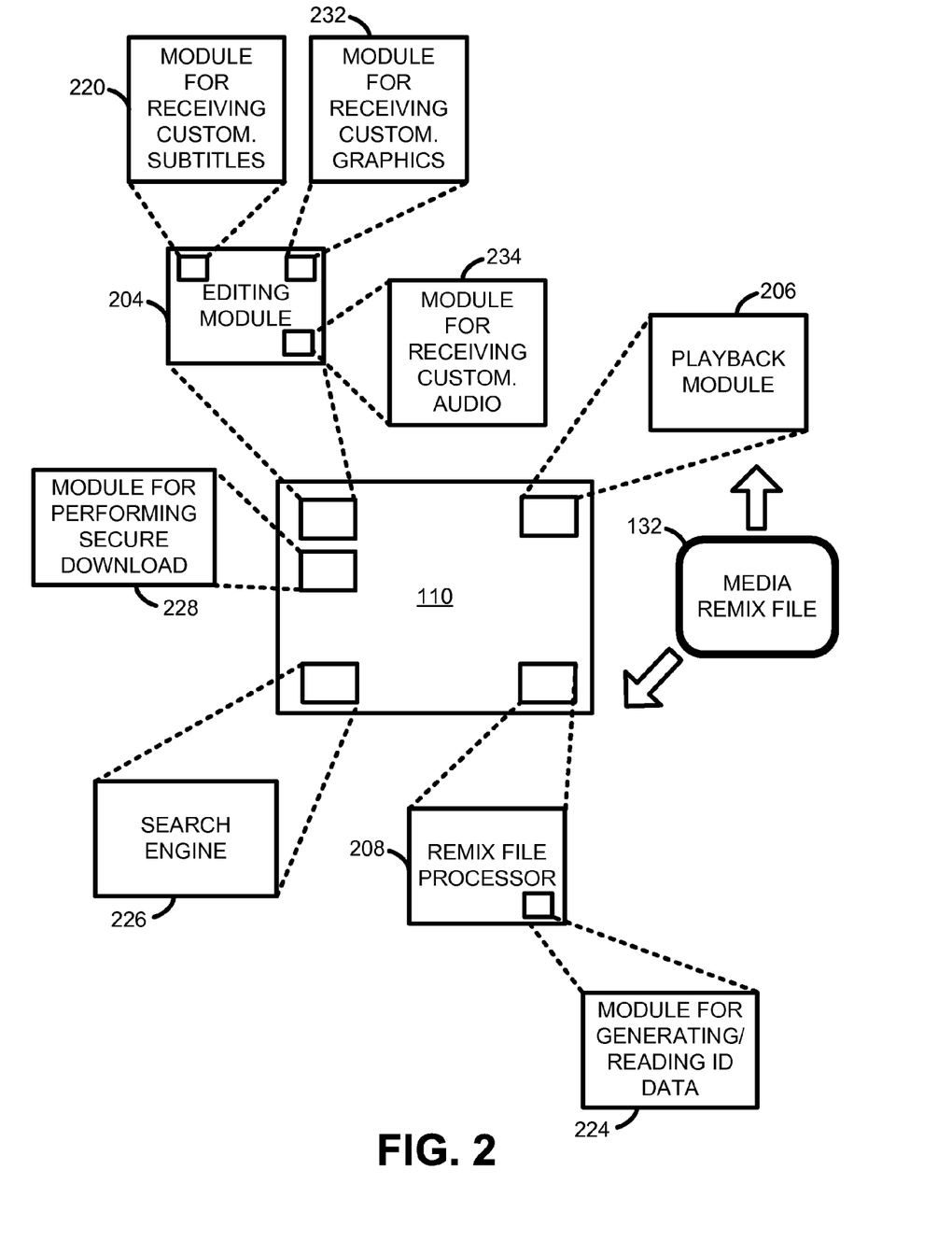
FIG. 2 is a block diagram illustrating various components of the system in FIG. 1.

Reference is now made to FIG. 2, which is a block diagram illustrating various components of the system in FIG. 1. For some embodiments, the computing device 102 in which the media remix module 110 is incorporated may comprise a playback module 206, a remix file processor 208, and an editing module 204. The playback module 206 may be configured to both read a movie title (from a DVD or a BLU-RAY Disc, for example) and perform playback of the content while incorporating special effects specified in the media remix file 132. It should be noted that the playback module 206 accomplishes without actually modifying the original video content. The remix file processor 208 is generally configured to read the media remix file 132 and extract the identification data or fingerprint associated with the media remix file 132. The remix file processor 208 comprises a module for reading the fingerprint 224. For some embodiments, the module configured to read the fingerprint 224 may be further configured to generate fingerprints. The editing module 204 may comprise a module for receiving customized subtitles 220, a module for receiving customized graphics 232, and a module for receiving customized audio 234.

The computing device 102 further comprises a search engine 226 configured to search a collection of media content for a matching tile. As a non-limiting example, the search engine 226 may search a collection or catalog of DVD titles or BLU-RAY disc tiles. The search engine 226 is configured to identify matching media content based on a comparison between the identification data in the editing file and identification data associated with each of the one or plurality of media content. In some embodiments, the search engine 226 may be configured to perform searching functions over a network such as the Internet.

The computing device 102 further comprises a module 228 for performing a secure download. This module 228 is utilized after a matching title has been found and the user is ready to play back the movie title. This module is utilized after a matching title has been found and the user is ready to play back the movie title. In particular, a user interface may be used to display all the matching media content to a user. When the user selects one of the matching media content shown on the user interface, the module 228 begins to download the media content. The module 228 may be further configured to perform a secure download of a managed copy of a movie title, for example. In other embodiments, the module 228 may also be configured to receive streaming video where the special effects specified in the media remix file 132 are incorporated during playback. It should be emphasized again that under both scenarios, the video content is left unmodified while special effects contained in the editing file are incorporated during playback. If the user elects to download a managed copy, the module 228 deletes the managed copy upon playback to prevent unauthorized access to the managed copy.

Figure 3:
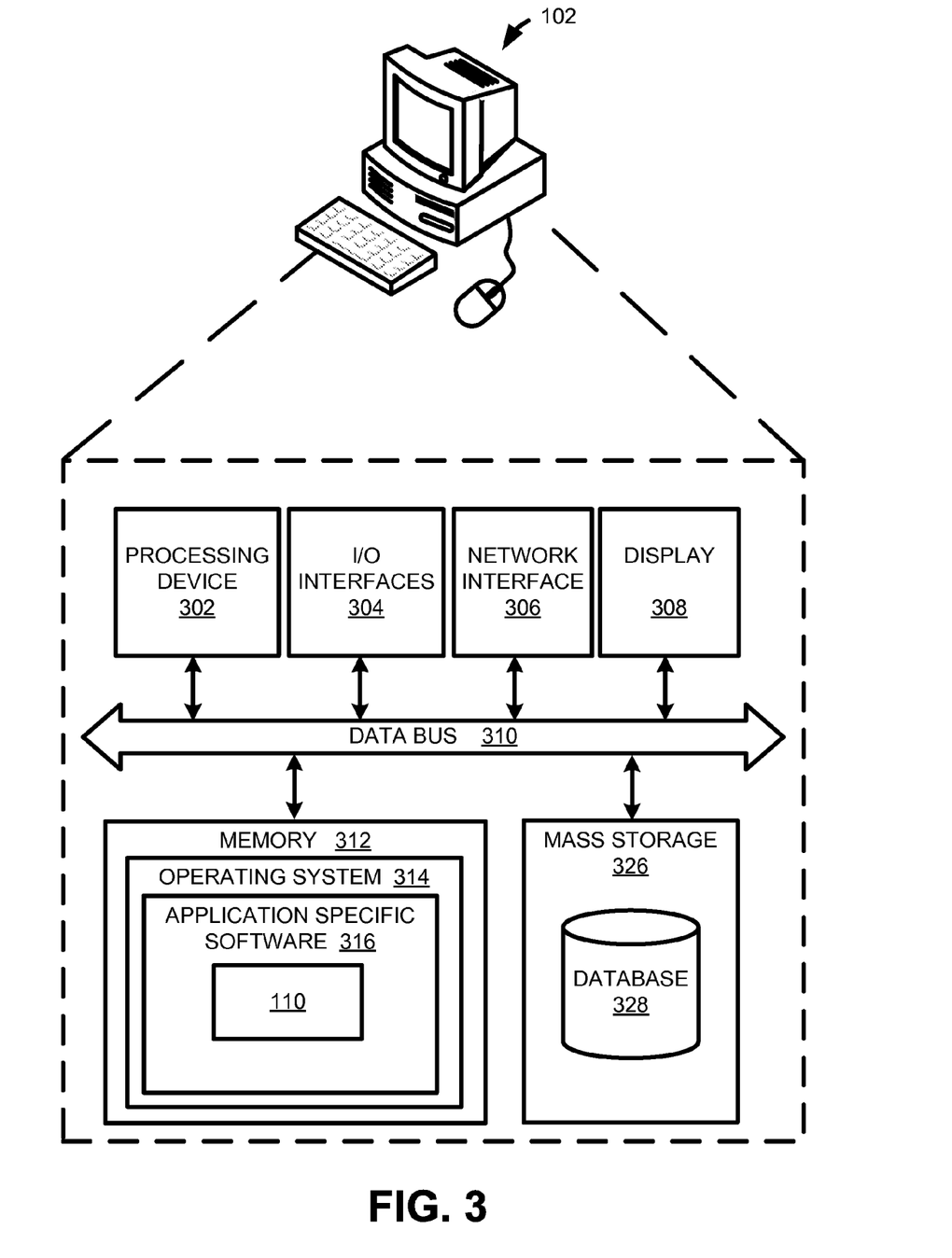
FIG. 3 illustrates an embodiment of the computing device shown in FIG. 1 for executing the various components shown in FIG. 2.

Reference is now made to FIG. 3, which illustrates an embodiment of the computing device 102 shown in FIG. 1 for executing the various components shown in FIG. 2. Generally speaking, the computing device 102 may comprise any one of a wide variety of wired and/or wireless computing devices, such as a desktop computer, portable computer, dedicated server computer, multiprocessor computing device, cellular telephone, personal digital assistant (PDA), handheld or pen based computer, embedded appliance and so forth. Irrespective of its specific arrangement, computing device 102 can, for instance, comprise memory 312, a processing device 302, a number of input/output interfaces 304, a network interface 306, a display 308, and mass storage 326, wherein each of these devices are connected across a data bus 310.

Processing device 302 can include any custom made or commercially available processor, a central processing unit (CPU) or an auxiliary processor among several processors associated with the computing device 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 312 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 312 typically comprises a native operating system 314, one or more native applications, emulation systems, or emulated applications for any of a variety of operating systems and/or emulated hardware platforms, emulated operating systems, etc. For example, the applications may include application specific software 316 such as the media remix module 110 described with respect to FIG. 2. One of ordinary skill in the art will appreciate that the memory 312 can, and typically will, comprise other components which have been omitted for purposes of brevity.

Input/output interfaces 304 provide any number of interfaces for the input and output of data. For example, where the computing device 102 comprises a personal computer, these components may interface with user input device 304, which may be a keyboard or a mouse, as shown in FIG. 1. Where the computing device 102 comprises a handheld device (e.g., PDA, mobile telephone), these components may interface with function keys or buttons, a touch sensitive screen, a stylist, etc. Display 308 can comprise a computer monitor or a plasma screen for a PC or a liquid crystal display (LCD) on a hand held device, for example.

In the context of this disclosure, a "computer-readable medium" stores, communicates, or transports the program for use by or in connection with the instruction execution system, apparatus, or device. The computer readable medium can be, for example, but not limited to, an electronic, magnetic, optical, electromagnetic, infrared, or semiconductor system, apparatus, device, or transport medium. More specific examples (a non-exhaustive list) of the computer-readable medium may include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

With further reference to FIG. 3, network interface device 306 comprises various components used to transmit and/or receive data over a network environment. By way of example, the network interface 306 may include a device that can communicate with both inputs and outputs, for instance, a modulator/demodulator (e.g., a modem), wireless (e.g., radio frequency (RF)) transceiver, a telephonic interface, a bridge, a router, network card, etc.). The computing device 102 may further comprise mass storage 326. For some embodiments, the mass storage 326 may include a database 328 to store and manage such data as metadata.

Figure 4:
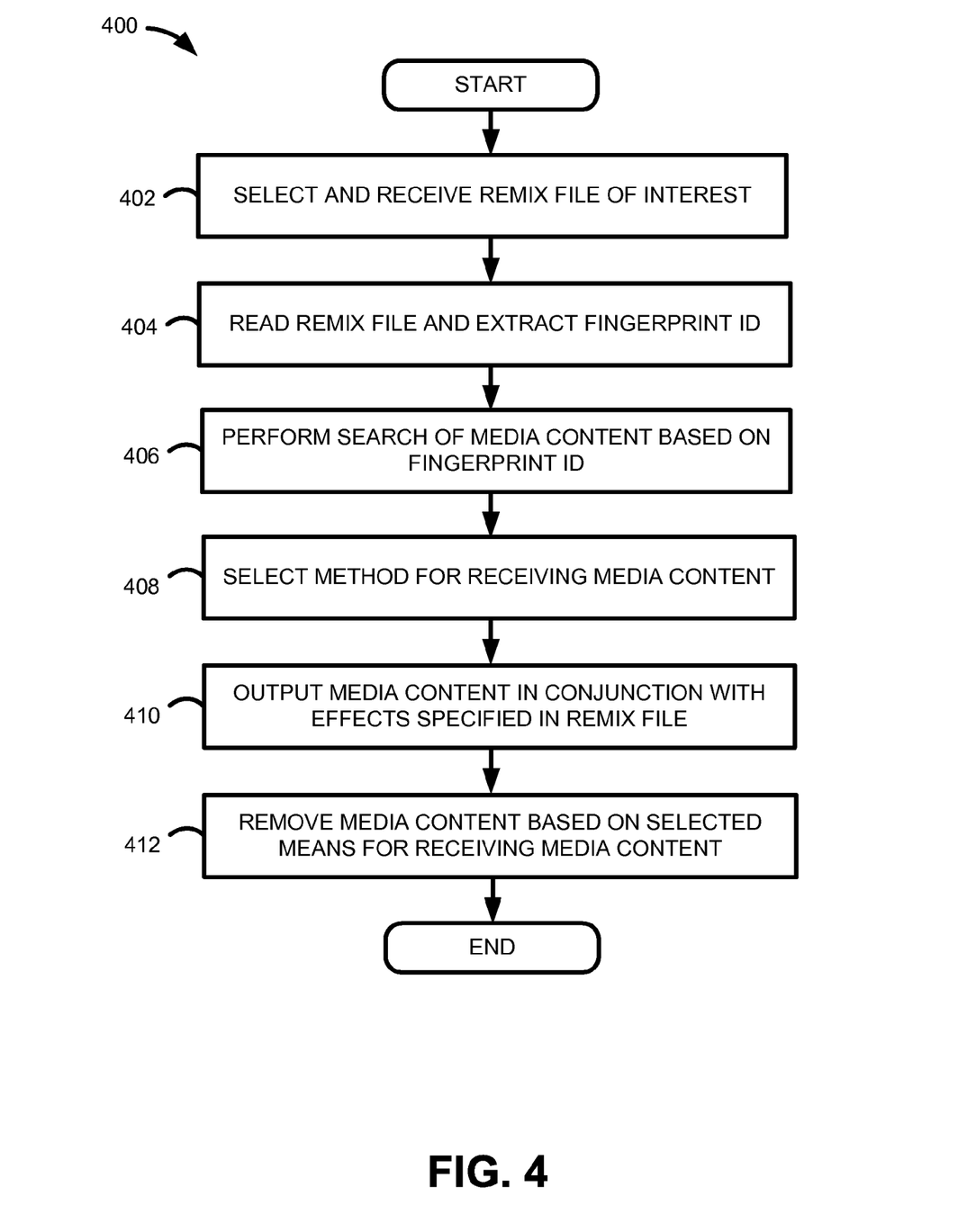
FIG. 4 depicts an embodiment of a method for searching media content based on identification data while utilizing the system depicted in FIGS. 1-3.

Reference is made to FIG. 4, which depicts an embodiment of a method 400 for searching media content based on identification data. Beginning in block 402, a media remix file of interest is selected by a user. The selection process may be performed, for example, over the Internet. The media remix file may be selected, for example, based on a descriptive title such as "Greatest Car Chase" and "Harry Potter Remix." The user might also select a media remix file based on who authored the file. For example, the user might be part of a community of users who share media remix files.

In block 404, the selected remix file is read and identification data embedded within the remix file is extracted. In block 406, a search is performed based on the extracted identification data, or fingerprint identification. Upon finding a matching movie title in block 408, the user may then select a method for receiving the media content. For some embodiments, the user may elect to either download an authorized managed copy of the matching media movie title or receive streaming video of the managed copy. In block 410, the received media content is then output in conjunction with any special effects specified in the remix file. The received media content itself, however, is left unmodified. With reference back to block 408, if the user elects to download a managed copy, the managed copy is deleted upon completion of playback (block 412) to protect again unauthorized copying and distribution of the video content.

It should be noted that the methods or processes described above should not be limited to the particular sequence of steps described. As one of ordinary skill in the art will appreciate, other sequences of steps may be possible, and the particular order of steps set forth herein should not be construed as limitations on the claims. In addition, the claims directed to the method and/or process of various embodiments should not be limited to the performance of their steps in the order written, and one skilled in the art can readily appreciate that the sequences may be varied and still remain within the spirit and scope of the present invention.

Figure 5:
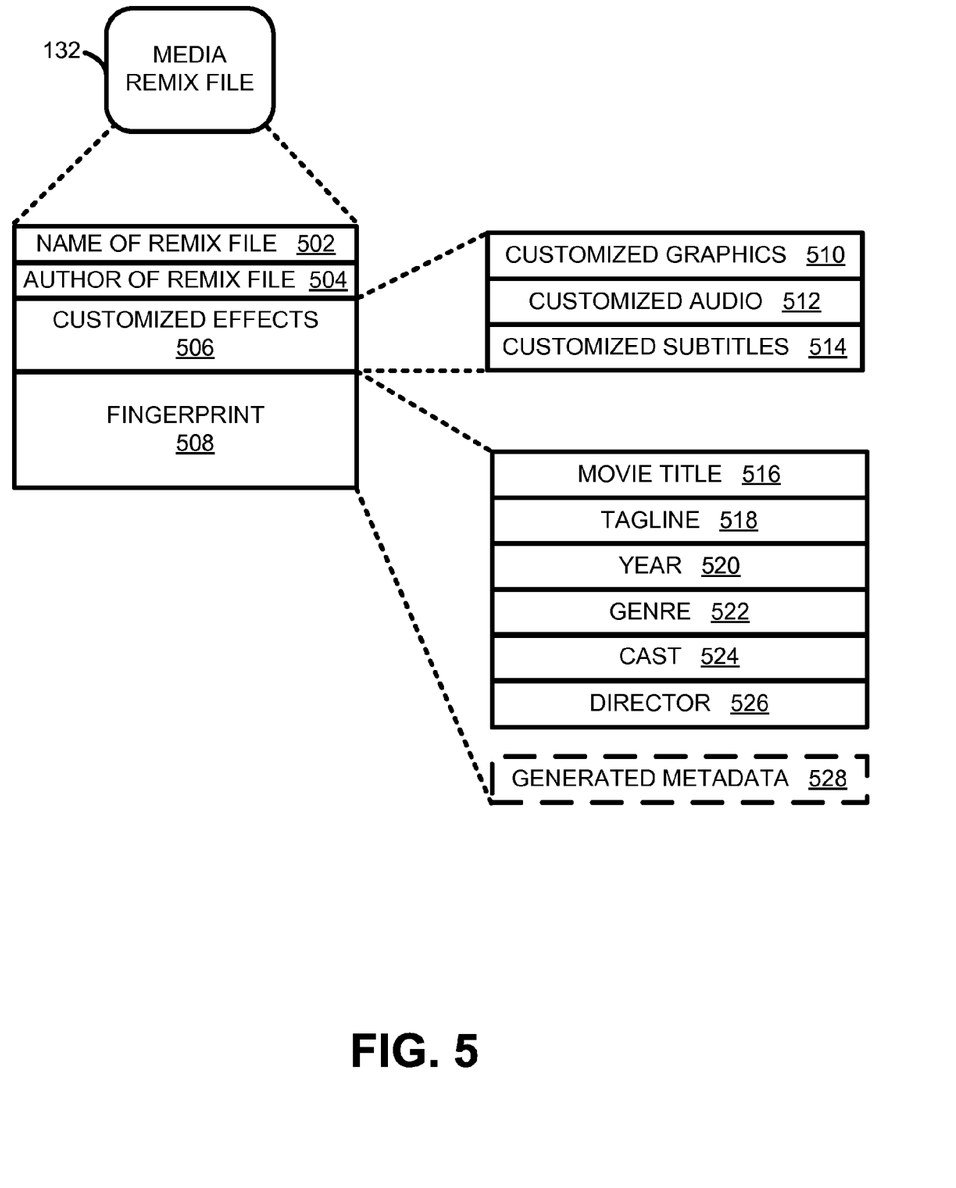
FIG. 5 illustrates an embodiment of the media remix file illustrated in FIG. 1.

Reference is made to FIG. 5, which illustrates an embodiment of the media remix file illustrated in FIG. 1. It should be noted that the embodiment described below is just one of many possible embodiments of the media remix file 132. The description of the media remix file 132 should not be construed as limiting the present disclosure, but instead is only intended to be exemplary in nature. The media remix file 132 may generally be partitioned into multiple blocks, which include the name of the remix file 502, the author of the remix file 504, the customized effects 506, and the identification data of fingerprint 508. The customized effects 506 may include, for example, customized graphics, 510, customized audio, 512, and customized subtitles 514. As discussed earlier, the fingerprint 508 may be utilized to identify particular media content in the event that a search is performed. The fingerprint 508 may be comprised of various attributes associated with the particular movie title. These attributes may include, for example, the movie title 516, a tagline 518 commonly associated with the movie title 516, the year 520 in which the movie was released, genre 522 (adventure, romance, action, etc.), cast 524 (e.g., main actors or actresses), and the director 526 of the movie title. It should be noted that the list of attributes discussed above is not an exhaustive list and is merely provided for illustrative purposes.

In preferred embodiments, the fingerprint is generated based on the title information relating to the media content (e.g., title length) and chapter information (e.g., chapter length, chapter number). The fingerprint may also be generated based on video/audio attributes associated with the particular media content and disc attributes such as the region code. In accordance with other embodiments, the fingerprint 508 may also be comprised of metadata 528 specified or identified by the user when the user is creating the media remix file/editing file 132.

For purposes of nomenclature used herein, the term metadata broadly refers to any information regarding data such as a video, for example. In this respect, metadata may describe a video and may be utilized in a wide variety of ways. As non-limiting examples, metadata might contain miscellaneous information about a given video such as the chapter list, content rating (e.g., General (G), Parental Guidance (PG), PG-13, Restricted (R)), performers (actors, actresses, musicians, etc.), and a brief synopsis of the movie. Other non-limiting examples include a unique ID assigned to the video, which may comprise a serial number assigned to the video by the author, a serial number assigned by the content provider, and a serial number assigned by a community of viewers. In this regard, the generated metadata 528 may be based on any one or combination of attributes described earlier. However, generated metadata 528 may also comprise other attributes identified by the user. This may comprise, for example, information relating to scene transitions, information relating to the audio content, etc. As described herein, the fingerprint 508 is used to uniquely identify matching media content and is embedded within the media remix file 132.

Figure 6:
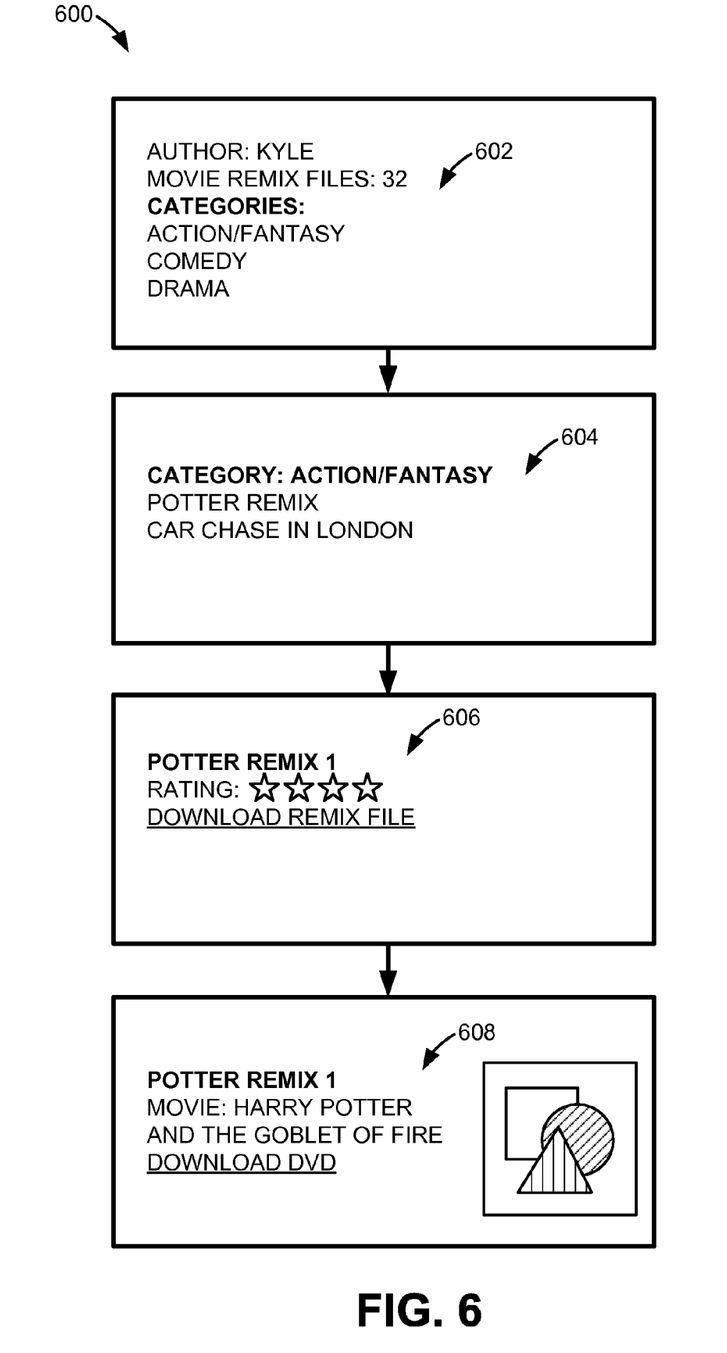
FIG. 6 illustrates one embodiment of a user interface.

Reference is made to FIG. 6, which depicts one embodiment of a user interface. In particular, FIG. 6 illustrates a simplified user interface 600 that a user might utilize to select a media remix file created by an author who is part of a community of remix file authors. The selection process may be conducted over the Internet. The selected media remix file/editing file is then used to search for a matching movie title. As a non-limiting example, the user may be presented with basic information 602 such as the author, number of movie remix files created by that author, and categories of remix files. Upon selecting a particular category 604, the user is presented with a corresponding list of remix files.

It should be noted that in many cases, the name or title of the remix file itself may not match the movie title associated with the remix file/editing file as the name of the editing file shown on the user interface 600 can be customized by the user. For example, the user may elect to use a different language to assign a name or title to the remix file. As another example, the user might elect to use a more descriptive name for the remix file/editing file such as "POTTER REMIX." Upon selecting a particular remix file, the user may then be presented with a rating assigned to the remix file and be given the option of downloading the remix file 606. Upon downloading the remix file, the fingerprint embedded within the remix file is extracted and based on this fingerprint, the movie title associated with the remix file is identified. In the non-limiting example shown, the actual movie title associated with the remix file is "*Harry Potter and the Goblet of Fire.*" The user may then be given the option of downloading the movie title itself 608. As described earlier, the user may either download an authorized managed copy of the movie title or receive a video stream of the movie title.

Figure 7:
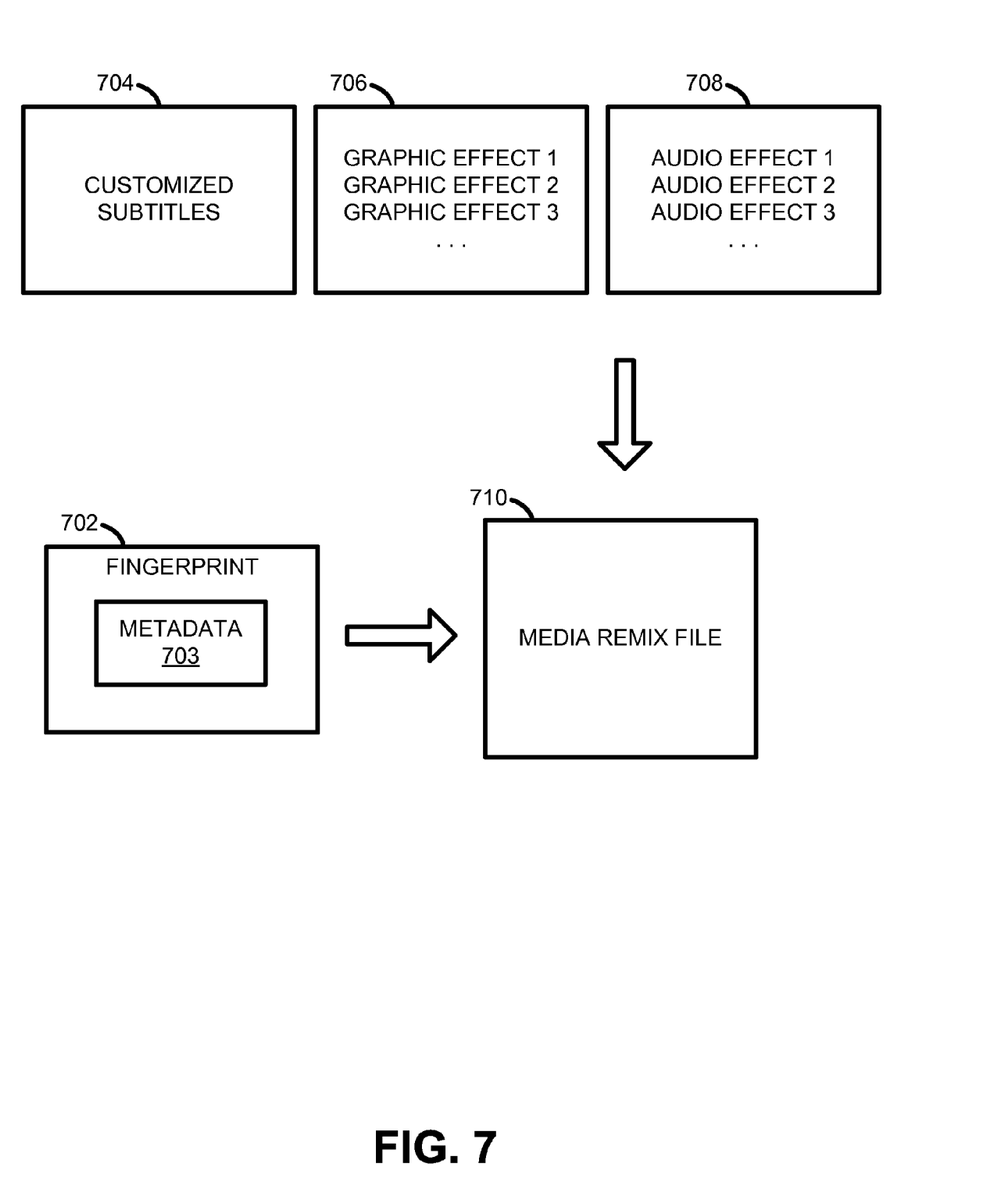
FIG. 7 illustrates the step shown in the exemplary method of FIG. 4 for incorporating special effects during playback of the movie title.

Reference is made to FIG. 7, which illustrates the creation of a media remix file 710. Utilizing the components illustrated in FIGS. 1 and 2, a user may elect to incorporate various special effects including customized subtitles 704, graphics effects 706, and audio effects 708 into a particular movie title. The special effects 704, 706, 708 specified by the user are captured and saved in a media remix file 710. During playback of the movie title, the special effects are incorporated. The original movie title, however, is left unmodified. Upon creation of the media remix file 710, a fingerprint 702 that identifies the movie title may also be embedded into the media remix file 710 when the user creates a movie remix file 710 associated with particular media content. As described earlier, the fingerprint 702 may comprise various attributes or metadata 703 associated with the movie title.

Figure 8:
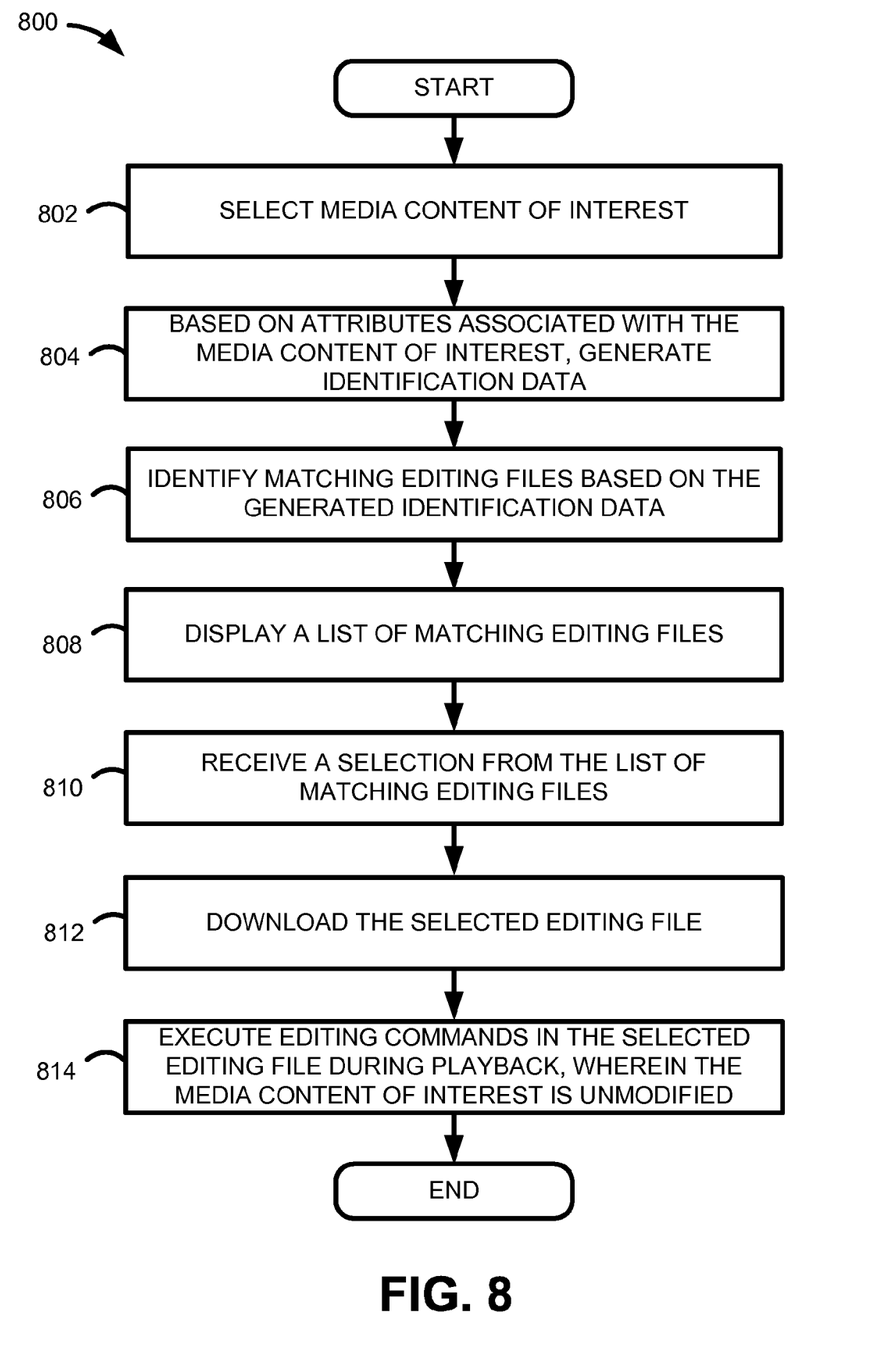
FIG. 8 illustrates an embodiment for searching an editing file based on identification data associated with media content.

In accordance with some embodiments, the system in FIGS. 1 and 2 may also be utilized to search for a matching editing file based on selected media content such as a DVD title or a HD-DVD title, for example. Reference is made to FIG. 8, which illustrates an embodiment 800 for searching an editing file based on identification data associated with media content. Beginning in block 802, a user selects media content of interest. Based on attributes associated with the media content of interest (e.g., DVD title) identification data is generated which uniquely identifies the media content of interest (block 804).

In block 806, the generated identification data is then used to search and identify matching editing files by determining whether the generated identification data matches identification data embedded in each of the one or a plurality of editing files. As described above, editing files (remix files) comprise editing commands or special effects to be executed or incorporated during playback of the media content of interest. Editing files also include identification data associated with the media content in which the special effects are to be incorporated. In block 808, if one or more matching editing files are found, a list of matching editing files is generated and displayed to the user. In block 810, the system receives from the user a selection from among the list of matching editing files. The selection by the user may be based, for example, on who authored the editing file. As another non-limiting example, the selection may be based on a description accompanying the editing file or the title of the editing file.

In block 812, the selected editing file is downloaded over the Internet. In accordance with some embodiments, a list of matching editing files is shown on a user interface of the playback module 206, which a user uses to select an editing file of interest. The selected editing file is then downloaded. In block 814, the editing commands/special effects embedded or specified in the selected editing file are executed during playback of the media content of interest. It should be noted that the media content of interest is unmodified.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

The invention claimed is:

1. A computing device for searching media content based on identification data embedded in an editing file, comprising:
    at least one processor;
    a processor module implemented by the at least one processor and configured to read the editing file and extract identification data from the editing file, wherein the extracted identification data is based on attributes associated with a particular media content;
    a search engine implemented by the at least one processor and configured to search one or a plurality of media content based on the extracted identification data and identify the particular media content;
    a module implemented by the at least one processor and configured to perform a secure download of the identified particular media content based on the extracted identification data; and
    a playback module implemented by the at least one processor and configured to consolidate the identified media content with special effects into a single output and play back the single output comprising the identified media content and the special effects, wherein the special effects are specified in the editing file, wherein the special effects comprise at least one of subtitles and graphics effects applied onto the identified media content, and wherein the identified media content is unmodified during playback.

2. The computing device of claim 1, wherein the search engine is configured to identify matching media content based on a comparison between the identification data in the editing file and identification data associated with each of the one or plurality of media content.

3. The computing device of claim 1, wherein the attributes comprise at least one of: movie title, tagline, year of release, genre, cast, director, chapter information, title information, video attributes associated with the particular media content, audio attributes associated with the particular media content, and disc attributes.

4. The computing device of claim 1, wherein the attributes comprise metadata specified by a user.

5. The computing device of claim 1, wherein the module configured to perform a secure download of the identified media content is further configured to perform at least one of:
download a managed copy of the identified media content over the Internet; and
receive the identified media content via streaming.

6. The computing device of claim 1, wherein the module configured to perform a secure download of the identified media content is further configured to:
download a managed copy of the identified media content over the Internet; and
remove the managed copy after playback of the identified media content.

7. The computing device of claim 1, further comprising:
an editing module implemented in the computing device and configured to receive editing commands for the particular media content and to associate the editing commands with the particular media content for future playback while the particular media content is left unmodified,
wherein the editing commands are stored in the editing file, and
wherein the playback module is further configured to incorporate the editing commands during playback of the identified media content.

8. The computing device of claim 7, wherein the editing module comprises at least one of:
a module for receiving customized subtitles to be substituted in place of original subtitles within the identified media content;
a module for receiving customized audio content;
a module for receiving one or more selections of subscenes to be removed based on whether the subscenes are subscenes of interest; and
a module for receiving customized graphics; and
a module for storing the identification data of the particular media content in the editing file.

9. The computing device of claim 7, further comprising a receiving module implemented in the computing device and configured to receive the editing file over the Internet.

10. A method for searching media content based on identification data embedded in an editing file, comprising:
receiving, by a computing device, the editing file and extracting identification data from the editing file, wherein the extracted identification data is based on attributes associated with a particular media content;
searching, by the computing device, one or a plurality of media content based on the identification data and identifying the particular media content;
performing, by the computing device, a secure download of the identified particular media content based on the extracted identification data;
consolidating, by the computing device, the identified media content with special effects specified in the editing file into a single output; and
performing, by the computing device, playback of the single output, wherein the special effects comprise at least one of subtitles and graphics effects applied onto the identified media content, and wherein the media content is unmodified during playback.

11. The method of claim 10, wherein receiving the editing file is performed over the Internet.

12. The method of claim 10, wherein the identification data is based on attributes associated with the particular media content.

13. The method of claim 12, wherein the attributes comprise at least one of: movie title, tagline, year of release, genre, cast, director, chapter information, title information, video attributes associated with the particular media content, audio attributes associated with the particular media content, and disc attributes.

14. The method of claim 10, wherein searching one or a plurality of media content is performed over the Internet.

15. The method of claim 10, wherein performing secure download of the identified media content comprises:
downloading a managed copy of the identified media content over the Internet; and
streaming the identified media content.

16. The method of claim 15, further comprising removing the managed copy after playback of the identified media content.

17. A non-transitory computer readable medium storing a computer program, the computer program comprising:
logic configured to receive an editing file and extract identification data from the editing file, wherein the identification data is uniquely associated with a particular media content, and wherein the extracted identification data is based on attributes of the particular media content;
logic configured to search a database of media content based on the extracted identification data and identify the particular media content;
logic configured to perform a secure download of the identified particular media content based on the extracted identification data;
logic configured to consolidate the identified media content with special effects specified in the editing file into a single output; and
logic configured to perform playback of the single output, wherein the special effects comprise at least one of subtitles and graphics effects applied onto the identified media content, and wherein the identified media content is unmodified during playback.

18. The non-transitory computer readable medium of claim 17, wherein attributes comprise at least one of: movie title, tagline, year of release, genre, cast, director, chapter information, title information, video attributes associated with the particular media content, audio attributes associated with the particular media content, and disc attributes.

19. The non-transitory computer readable medium of claim 17, wherein logic configured to perform a secure download is further configured to perform at least one of: download a managed copy of the identified media content, and stream the identified media content.

20. The non-transitory computer readable medium of claim 17, wherein logic configured to perform a secure download is further configured to:
- download a managed copy of the identified media content; and
- remove the managed copy after playback of the identified media content.

21. The non-transitory computer readable medium of claim 17, wherein logic configured to search a database of media content is further configured to perform the search over the Internet.

* * * * *